United States Patent [19]

McEachern et al.

[11] Patent Number: 5,526,694

[45] Date of Patent: Jun. 18, 1996

[54] INSTRUMENT FOR DETECTING HIDDEN STRUCTURAL DAMAGE IN MULTI-STORY BUILDINGS

[75] Inventors: Alexander McEachern; Joseph Ungerer, both of Alameda, Calif.

[73] Assignee: Infrastructure Instruments Inc., Emeryville, Calif.

[21] Appl. No.: 339,547

[22] Filed: Nov. 15, 1994

[51] Int. Cl.[6] .................................................. G01D 21/00
[52] U.S. Cl. ........................... 73/587; 73/579; 73/594; 73/801
[58] Field of Search ....................... 73/801, 587, 786, 73/579, 581, 582, 583, 594; 364/506, 508, 512

[56] References Cited

U.S. PATENT DOCUMENTS

| | | | |
|---|---|---|---|
| 4,227,198 | 10/1980 | Preskitt et al. | 346/33 C |
| 4,480,480 | 11/1984 | Scott | 73/786 |
| 4,901,575 | 2/1990 | Bohannan | 73/587 |
| 4,956,999 | 9/1990 | Bohannan | 73/587 |
| 5,117,696 | 6/1992 | Schmid | 73/517 R |
| 5,134,883 | 8/1992 | Shannon | 73/517 R |
| 5,180,969 | 1/1993 | Kwun et al. | 324/71.2 |
| 5,261,277 | 11/1993 | Thomas et al. | 73/517 AV |
| 5,327,358 | 7/1994 | Stubbs | 364/508 |

OTHER PUBLICATIONS

G. W. Housner and A. G. Brady, *Natural Periods of Vibrations in Buildings*, Journal of the Engineering Mechanics Division, Proceedings of the American Society of Civil Engineers, Aug. 1963, vol. 89 No. EM 4, pp. 31–59.

C. Dobryn, N. Isyumov, and A. Masciantonio, Prediction and *Measurement of Wind Response: Case Story of a Wind Sensitive Building*, Dynamics of Structures Proceedings, American Society of Civil Engineers, Aug. 1987, pp. 616–631.

J. D. Littler and B. R. Ellis, *Interim findings from full-scale measurements at Hume Point*, Journal of Wind Engineering and Industrial Dynamics, vol. 36, 1990, pp. 1181–1190.

Wojtek Jesien, Theodore Stathopoulos, and H. Kinh Ha, *Dynamic Along-Wind Response of Buildings: Comparative Study*, Journal of Structural Engineering, May 1993, vol. 119 No. 5, pp. 1498–1515.

*Primary Examiner*—Hezron E. Williams
*Assistant Examiner*—Christine K. Oda

[57] ABSTRACT

An electronic measuring instrument measures and records the acceleration frequency spectra of a multi-story building while it is excited by wind. Such frequency spectra are indicative, in part, of building structural stiffness. When a tramatic structural event occurs, such as an earthquake, an explosion, or a hurricane, changes in wind-excited frequency spectra are used to detect hidden structural damage to the building.

6 Claims, 3 Drawing Sheets

INSTRUMENT FOR DETECTING HIDDEN STRUCTURAL DAMAGE IN MULTI-STORY BUILDINGS

CROSS REFERENCE TO RELATED APPLICATION

None.

BACKGROUND—FIELD OF THE INVENTION

This invention relates to electronic measuring and recording instruments, more specifically to electronic instruments for measuring and recording accelerometer spectra.

BACKGROUND OF THE INVENTION

When a traumatic mechanical force is applied to a building structure, such as an earthquake, a hurricane, or an explosion, the building may collapse or suffer obvious structural damage; or it may be undamaged; or it may sustain hidden damage.

This invention concerns hidden damage.

Hidden damage may consist, for example, of buckled or cracked structural steel that has returned to its original position but no longer provides its original structural strength. Subsequent mechanical traumas, perhaps much smaller than the ones the building was originally designed to survive, may cause a building that has sustained hidden structural damage to collapse catastrophically.

Hidden damage may be extraordinarily expensive to detect. For example, in most steel space-frame buildings, the structural steel is not visible once the building is completed, because it is covered with a layer of fireproofing material, then is enclosed in a second layer of architectural material. Removing these layers of material simply to inspect the structure after an earthquake, for example, may be impractically expensive.

There has been a long-existing and unsolved need for a simple, inexpensive tool to detect post-trauma hidden structural damage in a multi-story building.

It is well known in the art that building structures, such as office buildings, apartments, and hospitals, have natural resonant periods. When mechanically excited by earthquakes, wind, and other energy sources, such buildings vibrate at their particular dominant period. For example, one common rule of thumb is that a steel space-frame building will have a dominant period of approximately 0.1 seconds per floor of height; a fifteen-story building will have a dominant period of approximately 1.5 seconds, and will sway back and forth at this period when mechanically excited.

The period can also be conveniently and equivalently be expressed as a frequency. Most structures have several modes of resonance, and different modes occur at different frequencies. A convenient way to describe the all the resonant modes, at least in a single axis, is with a frequency spectrum.

This frequency spectrum is determined in large part by the building's height, the building's mass, and the building's stiffness. To a lesser extent, it is determined by construction materials and techniques, level and frequency of exciting forces, building shape, and internal structure.

Methods for determining the frequency spectrum of a building structure are known in the art. One prior-art method measures displacements and accelerations while exciting the structure with forces of controlled periods, such as large, unbalanced weights swung by electric motors.

A simpler prior-art method records the spectrum of a building structure by measuring its accelerations when stimulated by wind. This type of prior art has heretofore been exclusively concerned with structural damage caused by strong winds and hurricanes.

It has never before been appreciated that non-damaging wind-stimulated spectra may be useful for detecting hidden structural damage caused by other traumatic events, such as earthquakes.

In most cases, significant hidden structural damage will result in significant changes in building stiffness, and consequently result in significant changes in wind-stimulated acceleration frequency spectra.

OBJECTS AND ADVANTAGES

It is an object of this invention to provide a small, simple, inexpensive instrument to detect changes in the pre- and post-trauma structural properties of multiple-story buildings.

It is a further object of this invention to provide such detection without requiring a man-made force excitation source.

It is a further object of this invention to provide a convenient way of comparing the pre- and post-trauma structural properties of multiple-story buildings.

Still further objects and advantages will become apparent from a consideration of the ensuing description and accompanying drawings.

PREFERRED EMBODIMENT—DESCRIPTION

Figure 1:
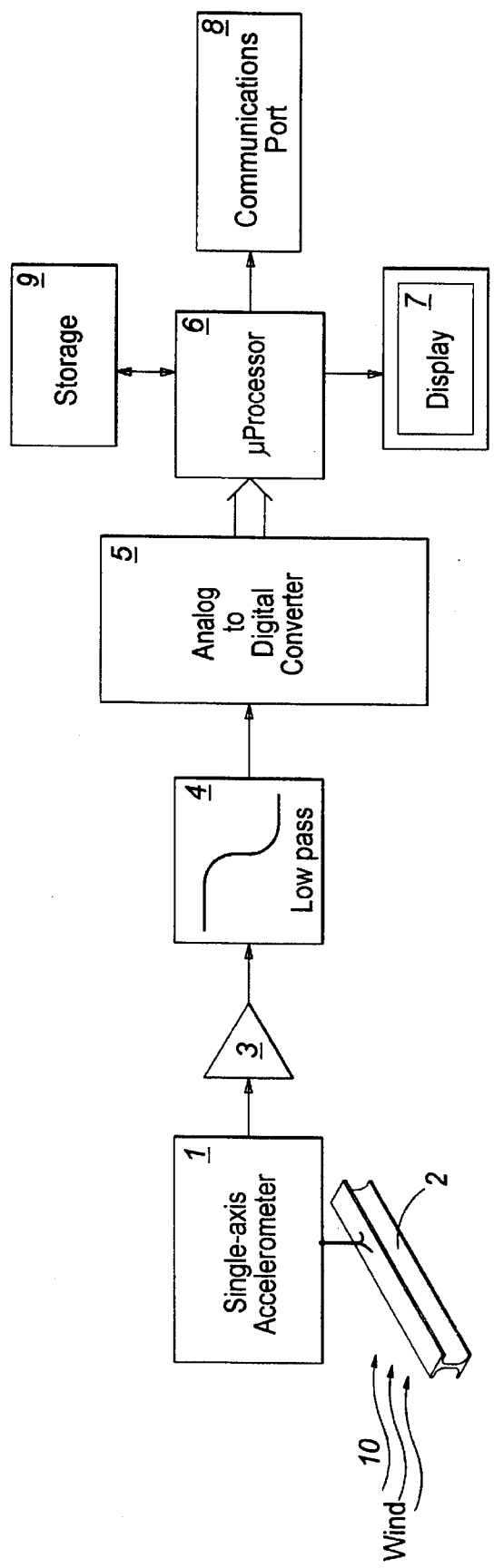
FIG. 1 is a block diagram of a preferred embodiment of the present invention.

Turning first to FIG. 1, we see a single-axis accelerometer 1 firmly attached to a building structure 2. It will be recognized by one familiar with the art that the 'I'-beam shown as the building structure 2 in FIG. 1 is a stylized depiction of all of the building structure, and should not be interpreted as a pictorial representation of the location of the accelerometer 1. This accelerometer 1 is sufficiently sensitive to measure the resonant accelerations of the building structure as it responds to wind 10 (a light to fresh breeze, between 1 and 10 meters per second). We have determined by experiment that a sensitivity of 200 micro-g's is necessary (where g represents the acceleration of gravity), and that a sensitivity of 10 micro-g's is desirable. These values can alternatively be express as accelerations of 2 millimeters per second squared and 0.1 millimeters per second squared, respectively. These values can also be alternatively expressed as 0.02% g and 0.001% g, respectively.

One such accelerometer is the model QA-2000 available from Allied Signal Aerospace Corporation of Seattle, Wash.

To maximize the accelerometer's 1 signal, it is ideally placed near the top of the structure with its axis parallel to the least-stiff axis of the building structure. In some cases, it may be desirable to install additional accelerometers at the same or different locations; the signal from each of these additional accelerometers may be processed in the same way as the signal from the first accelerometer 1, although it may be desirable to orient the axes of the additional accelerometers differently from that of the first accelerometer 1 to maximize their response to different natural resonances in the structure.

Returning to FIG. 1, we see that the electronic output signal of accelerometer 1 is coupled to an amplifier 3, whose output is in turn coupled to a low-pass anti-aliasing filter 4. The output of the anti-aliasing filter 4 is in turn coupled to the input of an analog-to-digital converter 5, which regularly samples the voltage waveform at its input. As is well known to one familiar with the art, the sampling rate of the analog-to-digital converter 5 must be at least twice the highest frequency of interest in the voltage signal, and the characteristics of the low-pass filter 4 must ensure that the signal presented to the analog-to-digital converter 5 does not contain any frequency components higher than half the sampling rate. We have determined by experiment that a sampling rate of 25 samples per second is sufficient, and that a 4-pole 10 Hertz low-pass filter is sufficient for the present application.

A microprocessor 6 converts the time-domain samples from the analog-to-digital converter 5 to frequency-domain samples, using any well-known algorithm such as the Fast Fourier Transform.

Several sources of noise will influence the signal received by the microprocessor 6, including extraneous accelerations such as those caused by moving objects within the structure (elevators, people, etc.), thermal expansion and contraction of the building, and large vehicles passing nearby, as well as electrical noise. Any well-known noise-reduction technique, such as auto-correlation or averaging the magnitudes of several transform spectra, may be employed. We have determined by experiment that averaging the magnitudes of all transform spectra calculated in a 48-hour interval provides optimal results, although the averaging interval is not critical.

Several sources of zero-frequency or near-zero-frequency acceleration may also influence the signal received by the microprocessor 6, including inclination of the accelerometer 1, building tilt due to thermal expansion and contraction, and building tilt due to tides. The microprocessor 6 may employ any well-known algorithm for removing such zero-frequency sources from the signal, such as subtracting the mean value of each set of time-domain samples from each sample in the set.

The resonant accelerations of the building may be minimal when there is no wind, and may occur at a slightly different frequency when the wind is extraordinarily strong. The microprocessor 6 may employ an algorithm that discards frequency spectra that include a peak that is either too small or too large (corresponding to no wind or excessive wind, or possibly small earthquakes). We have determined by experiment that rejecting spectra whose peak is smaller than one-fifth the prior week's mean peak or larger than five times the prior week's mean peak provides useful results. We have also determined that it is useful to reject spectra whose peak is less than sixteen times the resolution of the accelerometer 1. Spectra with peaks that fall within these limits may be included in the historical spectra stored in the microprocessor's 6 storage element 9, which may be battery-backed static random access memory or any other form of memory known in the art.

The resulting spectra may be shown on the display 7, along with a corresponding spectra recorded some time previously, for example 30 days ago. Display 7 in the preferred embodiment is a graphic liquid-crystal display, but any convenient microprocessor display known in the art may be used. Given the averaging period of the preferred embodiment (48 hours), one can inspect the display 7 at any time 48 hours or more after a traumatic event occurs, such as an earthquake, but not more than 30 days after the traumatic event occurs. If the current spectra is substantially similar to that shown for 30 days ago, one may conclude that there has been no substantial change in building structural stiffness, and that consequently hidden structural damage is unlikely to be found. If, however, the spectra is substantially changed from that shown for 30 days ago, one may conclude that some structural change may have occurred, and that further investment in searching for structural damage is justified. Spectra and control information may be passed to the instrument from another computer via communications port 8. Samples of spectra shown on the display 7 may be seen in FIG. 2 and FIG. 3.

Figure 2:
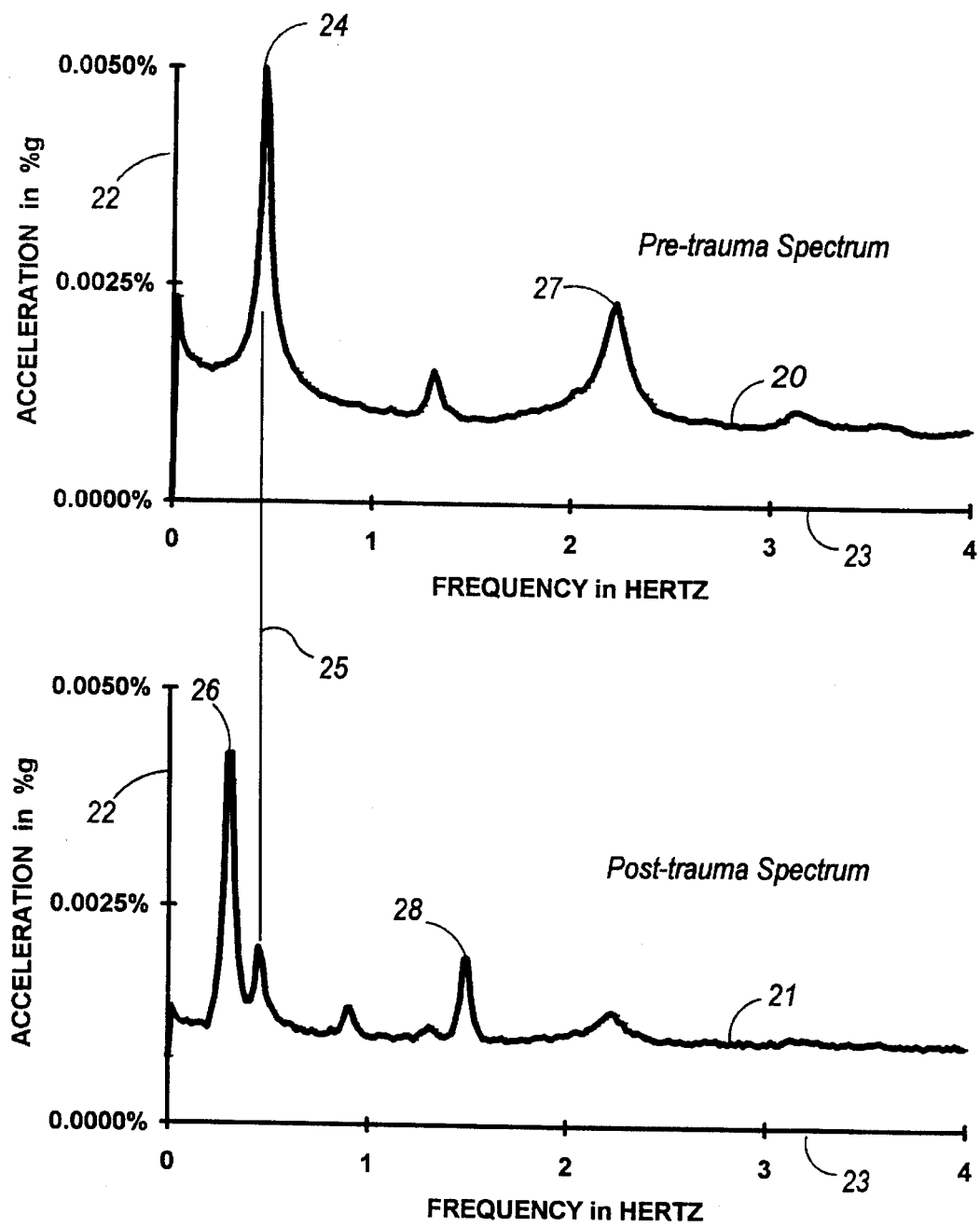
FIG. 2 shows pre- and post-trauma spectra, as shown on the display of FIG. 1, of a building that has sustained hidden damage in an earthquake.
Figure 3:
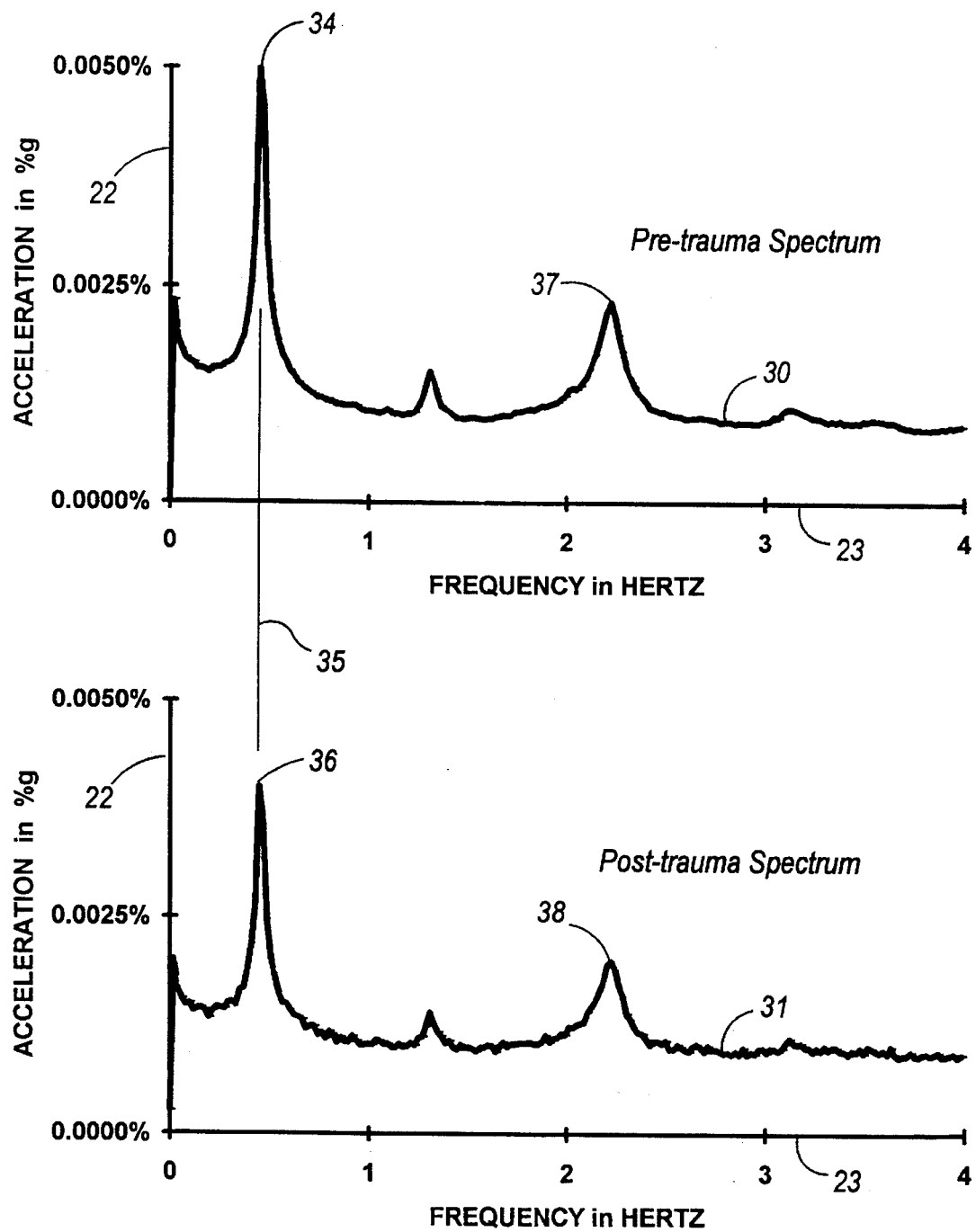
FIG. 3 shows pre- and post-trauma spectra for a building that has no hidden damage, drawn in such a way as to conveniently contrast with FIG. 2.

Turning now to FIG. 2, we see two-spectra recorded at the same building structure. The upper spectrum 20 is typical of one recorded prior to a traumatic event (an earthquake), and the lower spectrum 21 is typical of one recorded after a traumatic event. Each spectra is shown as a graph of frequency 23 versus acceleration 22.

The peak frequency 26 of the post-trauma spectrum is substantially lower than the peak frequency 21 of the pre-trauma spectrum. A reference line 25 placed at the same frequency as the peak of the pre-trauma spectrum 20 makes comparison of pre- and post-trauma peak frequencies 24, 26 more convenient.

The amplitude of the peaks 24, 26 is not relevant; the lower amplitude of the post-trauma peak 26 simply means that the average wind-speed during the 48-hour post-trauma period was somewhat lower than the average wind-speed during the pre-trauma period. Other differences between the two spectra may be observed as well, such as the differing frequencies of the secondary peaks 27, 28; one may reasonably suspect structural changes occurred during the traumatic event.

Turning now to FIG. 3, we again see two spectra from the same building structure. Once again, the upper spectrum 30 is typical of spectra recorded prior to a traumatic event (an earthquake), and the lower spectrum 31 is typical of spectra recorded after a traumatic event. Again, the spectra are graphed in a format that shows acceleration 22 versus frequency 23. The peak frequency 36 of the post-trauma spectrum occurs at substantially the same frequency as the peak frequency 34 of the pre-trauma spectrum. A reference line 35 assists in making this comparison. The rest of the spectra match well, including the secondary peaks 37, 38; one may reasonably suspect that no structural changes occurred during the traumatic event.

PREFERRED EMBODIMENT—OPERATION

In operation, the invention is simply attached to a building structure at a location selected according to the criteria described above, and left in place.

If an traumatic event, such as an earthquake, explosion, or hurricane, takes place and hidden structural damage is suspected, the display of the invention is inspected a few days after the traumatic event. The display will show the present frequency spectra of the building (corresponding to the post-trauma structural stiffness of the building) and the 30-days-past frequency spectra of the building (corresponding to the pre-trauma structural stiffness of the building). If there is minimal difference between the spectra, it is unlikely that the building has suffered hidden structural damage. But if the difference between the spectra is substantial, it is likely that there is hidden structural damage, and further investment in inspecting the building structure is warranted.

OTHER EMBODIMENTS

It will be apparent to one familiar with the art that other useful embodiments of the invention are possible. Multiple accelerometers may be employed, on orthogonal axes or at differing locations within the structure or both. Torsional accelerometers may be employed. Various displays, such as gas discharge displays, may be employed to display the most recent spectrum and a spectrum from the past. The peak amplitudes of the spectra may be normalized to a constant value. Numeric displays may be employed to show the period or frequency of the recent and past spectral peaks. A numeric display may simply show the present spectral peak or peaks, which may be periodically manually recorded by a building inspector or the like for later post-trauma comparison; the manual recording thus performs a function equivalent to that performed by the storage 9 of FIG. 1. Various other modifications may be made to the preferred embodiment without departing from the spirit and scope of the invention as defined by the appended claims.

We claim:

1. An apparatus for measuring changes over time in natural resonant frequencies of a multiple-story building structure, said apparatus employing a breeze to excite the natural resonant frequencies in the multiple-story building structure, comprising:
    a. an accelerometer rigidly mounted to the multiple-story building structure, wherein a steady, non-transient breeze with a velocity between 1 and 10 meters per second, excites the natural resonance frequencies in said structure, to produce a first electronic signal;
    b. an electronic low pass anti-aliasing filter coupled to the first electronic signal for selecting desired frequencies from the first electronic signal, producing a second electronic signal, said desired frequencies are below 10 Hertz;
    c. an analog-to-digital converter coupled to the electronic filter for periodically converting the second electronic signal into a digital time-domain signal;
    d. means for periodically converting the digital time-domain signal into a frequency-domain representation, forming a plurality of frequency-domain representations, each one of said frequency-domain representations having an associated time of recording;
    e. means for storing the plurality of the frequency-domain representations and the associated times of recording; and
    f. means for selecting from the plurality of frequency-domain representations a first frequency-domain representation having an associated first time of recording, and for selecting from the plurality of frequency-domain representations a second frequency-domain representation having an associated second time of recording, said means for selecting ensuring that the associated first time of recording is separated from the associated second time of recording by an interval of time; and means for comparing the first frequency-domain representation with the second frequency-domain representation, wherein when a peak frequency of the first frequency domain representation is shifted to a lower peak frequency of the second frequency domain representation, damage in the structural property of said multiple-story building is detected.

2. The invention according to claim 1, wherein the means for comparing the first frequency-domain representation with the second frequency-domain representation comprises simultaneous display of two spectra.

3. The invention according to claim 1, wherein the means for comparing the first frequency-domain representation with a second frequency-domain representation comprises simultaneous display of a first number representative of the frequency of the peak value of the first frequency-domain representation, and a second number representative of the frequency of the peak value of the second frequency-domain representation.

4. The invention according to claim 1, wherein the accelerometer is configured to resolve accelerations of 2 millimeters per second squared or less.

5. The invention according to claim 1, wherein the time interval is one hour or more.

6. The invention according to claim 1, wherein the accelerometer is configured to resolve accelerations of 2 millimeters per second squared or less, and the time interval is one hour or more.

* * * * *